(12) United States Patent
Jang et al.

(10) Patent No.: US 11,677,065 B2
(45) Date of Patent: *Jun. 13, 2023

(54) CATHODE ACTIVE MATERIAL OF LITHIUM SECONDARY BATTERY

(71) Applicant: ECOPRO BM CO., LTD., Cheongju-si (KR)

(72) Inventors: Sung Jin Jang, Cheongju-si (KR); Moon Ho Choi, Cheongju-si (KR); Jun Won Suh, Cheongju-si (KR); Jung Han Lee, Cheongju-si (KR); Ji Hyun Nam, Cheongju-si (KR); Seung Woo Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,705

(22) Filed: Jan. 11, 2022

(65) Prior Publication Data
US 2022/0140315 A1     May 5, 2022

Related U.S. Application Data

(63) Continuation of application No. 16/198,457, filed on Nov. 21, 2018, now Pat. No. 11,258,055.

(30) Foreign Application Priority Data

Nov. 22, 2017  (KR) .................. 10-2017-0156847
Aug. 16, 2018  (KR) .................. 10-2018-0095750

(51) Int. Cl.
    *C01G 53/00*     (2006.01)
    *H01M 4/131*    (2010.01)
    (Continued)

(52) U.S. Cl.
    CPC .......... *H01M 4/1315* (2013.01); *C01G 53/42* (2013.01); *C01G 53/50* (2013.01); *H01M 4/131* (2013.01);
    (Continued)

(58) Field of Classification Search
    CPC .......... H01M 10/05–0525; H01M 4/13–1315; H01M 4/139–13915; H01M 4/48–525;
    (Continued)

(56) References Cited

U.S. PATENT DOCUMENTS 11,258,055 B2 *  2/2022  Jang ..................... H01M 4/505
2014/0027670 A1   1/2014  Sun et al.
(Continued)

FOREIGN PATENT DOCUMENTS

WO     2016/052820 A1     4/2016

OTHER PUBLICATIONS

Office Action dated Apr. 29, 2020 in U.S. Appl. No. 16/198,457.
(Continued)

*Primary Examiner* — Jonathan Crepeau
*Assistant Examiner* — Jacob Buchanan
(74) *Attorney, Agent, or Firm* — Saliwanchik, Lloyd & Eisenschenk (57) ABSTRACT

The present invention relates to a cathode active material for a lithium secondary battery, and more particularly, to a cathode active material for a lithium secondary battery, which includes a core portion and a shell portion surrounding the core portion, in which a total content of cobalt in the core portion and the shell portion is 5 to 12 mol %, and the content of cobalt in the core portion and the shell portion is adjusted to be within a predetermined range.

In the cathode active material precursor and the cathode active material for a secondary battery prepared using the same according to the present invention, optimal capacity of
(Continued)

a lithium secondary battery may be increased by adjusting the cobalt content in the particles of the cathode active material, and life characteristics may be enhanced by improving stability.

3 Claims, 6 Drawing Sheets

(51) Int. Cl.
| | |
|---|---|
| *H01M 4/36* | (2006.01) |
| *H01M 4/505* | (2010.01) |
| *H01M 4/525* | (2010.01) |
| *H01M 4/02* | (2006.01) |
| *H01M 4/1315* | (2010.01) |
| *H01M 4/1391* | (2010.01) |
| *H01M 10/0525* | (2010.01) |

(52) U.S. Cl.
CPC ......... *H01M 4/1391* (2013.01); *H01M 4/366* (2013.01); *H01M 4/505* (2013.01); *H01M 4/525* (2013.01); *C01P 2004/61* (2013.01); *C01P 2004/86* (2013.01); *C01P 2004/88* (2013.01); *H01M 10/0525* (2013.01); *H01M 2004/021* (2013.01); *H01M 2004/028* (2013.01)

(58) Field of Classification Search
CPC .. C01G 53/00; C01G 53/04; C01G 53/40–56; C01G 51/00; C01G 51/06; C01G 51/40–56; C01G 45/00; C01G 45/02; C01G 45/12–1257
See application file for complete search history.

(56) References Cited

U.S. PATENT DOCUMENTS

| | | |
|---|---|---|
| 2014/0158932 A1 | 6/2014 | Sun et al. |
| 2015/0349327 A1 | 12/2015 | Hwang et al. |
| 2016/0006025 A1 | 1/2016 | Sun |
| 2016/0181597 A1 | 6/2016 | Kim et al. |
| 2016/0359165 A1 | 12/2016 | Kim et al. |
| 2017/0092935 A1 | 3/2017 | Sun et al. |
| 2018/0183046 A1 | 6/2018 | Jin et al. |

OTHER PUBLICATIONS

Office Action dated Oct. 26, 2020 in U.S. Appl. No. 16/198,457.
Sun et al., "A novel concentration-gradient Li[Ni.83Co0.07Mn0.10]O2 cathode material for high-energy lithium-ion batteries". J. Mater. Chem., 2011, 21, 10108-10112. Published Feb. 9, 2011. (Year: 2011).
Office Action dated May 6, 2021 in U.S. Appl. No. 16/198,457.
Notice of Allowance dated Oct. 13, 2021 in U.S. Appl. No. 16/198,457.

* cited by examiner

CATHODE ACTIVE MATERIAL OF LITHIUM SECONDARY BATTERY

CROSS-REFERENCE TO RELATED APPLICATIONS

This application is a continuation of U.S. application Ser. No. 16/198,457, filed Nov. 21, 2018; which claims the benefit under 35 U.S.C. § 119 of Korean Application Nos. 10-2017-0156847, filed Nov. 22, 2017; and 10-2018-0095750, filed Aug. 16, 2018; which are hereby incorporated in their entirety.

BACKGROUND OF THE INVENTION

Field of the Invention

The present invention relates to a cathode active material for a lithium secondary battery, and more particularly, to a cathode active material for a lithium secondary battery, which includes a core portion and a shell portion surrounding the core portion, in which the content of cobalt in the core portion and the shell portion is adjusted to be within a predetermined range and a total content of cobalt in the core portion and the shell portion is adjusted to 5 to 12 mol %.

Description of the Related Art

With the development of portable mobile electronic devices such as smart phones, MP3 players, and tablet PCs, demand for secondary batteries capable of storing electrical energy has explosively increased. In particular, demand for lithium secondary batteries is on the increase with the advent of electric vehicles, medium and large-sized energy storage systems, and portable devices requiring high energy density.

$LiCoO_2$ having a layered structure is commonly used as a cathode active material for a lithium secondary battery. $LiCoO_2$ is most commonly used due to excellent lifetime characteristics and charge/discharge efficiency thereof but it has low structural stability and thus has limitations in application to high capacity batteries.

Various lithium composite metal oxides such as $LiNiO_2$, $LiMnO_2$, $LiMn_2O_4$, $LiFePO_4$, $Li(Ni_xCo_yMn_z)O_2$, and the like, have been developed as a cathode active material to replace $LiCoO_2$. Among the lithium composite metal oxides, $LiNiO_2$ has the advantage of exhibiting battery characteristics of a high discharge capacity but it is difficult to synthesize by a simple solid state reaction and has low thermal stability and low cycle characteristics. Lithium manganese-based oxides such as $LiMnO_2$ or $LiMn_2O_4$ are advantageously excellent in thermal stability and low in price but have a problem of low capacity and low temperature characteristics. In particular, $LiMn_2O_4$ is commercialized in some low-priced products but life characteristics thereof are poor due to structural distortion (Jahn-Teller distortion) due to $Mn^{3+}$. $LiFePO_4$ has been widely studied for hybrid electric vehicles (HEV) due to low cost and safety thereof but it is difficult to apply to other fields due to low conductivity.

Recently, as an alternative cathode active material of $LiCoO_2$, lithium manganese cobalt oxide, $Li(Ni_xCo_yMn_z)O_2$ (here x, y, and z are atomic fractions of independent oxide component elements, respectively, wherein 0<x≤1, 0<y≤1, 0<z≤1, and 0<x+y+z≤1) has come to prominence. This material is advantageously low in price and may be used for high capacity and a high voltage but has low rate capability and poor life characteristics at a high temperature.

In order to solve such problems, a lithium nickel manganese cobalt oxide in which a metal composition including a core portion having a high nickel content and a shell portion having a low nickel content has a concentration gradient have been researched and developed. According to this method, an internal material having a predetermined composition is first synthesized, a material having a different composition is applied to the outside of the internal material to form a dual-layer, which is then mixed with lithium salt and heat-treated. As the internal material, a commercially available lithium transition metal oxide may be used.

However, this method has a disadvantage in that the metal composition of the cathode active material is changed discontinuously between the generated internal material and the external material composition, and thus, since the metal composition of the cathode active material is not changed continuously gradually, an internal structure thereof is unstable. Also, since powder synthesized by this method does not use ammonia, which is a chelating agent, it has low tap density and is inappropriate for use as a cathode active material for a lithium secondary battery.

SUMMARY

An aspect of the present invention provides a cathode active material precursor in which a total content of cobalt in a core portion and a shell portion is adjusted to a predetermined concentration, thus increasing safety and efficiency of a cathode active material having a core shell structure, and a cathode active material prepared using the same.

According to an aspect of the present invention, there is provided a cathode active material for a lithium secondary battery, including: a core portion and a shell portion surrounding the core portion, wherein when a total content of cobalt in the core portion and the shell portion is 5 to 12 mol % and the content of cobalt in the entire particles of the cathode active material is W, the content of cobalt in the shell portion is 0.2 W to 1.0 W.

The cathode active material having the related art core-shell structure has an unstable internal structure due to a discontinuous change in metal compositions, which leads to a reduction in efficiency of a lithium secondary battery. In order to solve the problem, in the present invention, it was confirmed that, in the cathode active material for a lithium secondary battery having a core-shell structure, excellent stability and efficiency are obtained when a total content of cobalt in the core portion and the shell portion is adjusted to a predetermined value, specifically, to 5 to 12 mol.

According to another aspect of the present invention, the present invention provides a cathode active material for a lithium secondary battery represented by Chemical Formula 1 below in which the total content of cobalt in the core portion and shell portion is adjusted to a predetermined value (5 to 12 mol %).

[Chemical Formula 1]

(Here, 0.9≤a≤1.3, 0.7≤x<1.0, 0.05≤y≤0.12, 0.0≤z≤0.3, and 0.0≤-x-y-z≤0.3, wherein M is one or more metal elements selected from among B, Ba, Ce, Cr, F, Mg, Al, Cr, V, Ti, Fe, Zr, Zn, Si, Y, Nb, Ga, Sn, Mo, W, P, Sr, Ge, and Cu).

In the cathode active material for a lithium secondary battery according to the present invention, when the content of cobalt in the entire particles of the cathode active material is W, the content of cobalt in the shell portion may be 0.2 W to 1.0 W.

According to one aspect of the present invention, when a diameter of the entire particles of the cathode active material according to the present invention is D, D may be 1 to 25 μm and a thickness of the shell portion may be 0.01 D to 0.3 D. That is, in the present invention, the thickness of the shell portion may be changed by adjusting the Co content in the entire particles and the Co content in the shell.

According to another aspect of the present invention, a lithium secondary battery including a cathode active material is provided.

The lithium secondary battery includes a cathode (positive electrode) including a cathode active material having the configuration described above, an anode (negative electrode) including an anode active material, and a separator present therebetween. Also, the lithium secondary battery includes an electrolyte immersed to be present in the cathode, the anode, and the separator. As the anode active material, a material capable of reversibly occluding/discharging lithium ions may be preferably used. For example, a material including artificial graphite, natural graphite, graphitized carbon fiber, amorphous carbon, and the like, may be used, and metal lithium may also be used as an anode active material. The electrolyte may be a liquid electrolyte containing a lithium salt and a non-aqueous organic solvent or may be a polymer gel electrolyte.

As described above, in the cathode active material precursor and the cathode active material for a secondary battery prepared using the same according to the present invention, optimal capacity of a lithium secondary battery may be increased by adjusting the cobalt content in the particles of the cathode active material, and life characteristics may be enhanced by improving stability.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, the present invention will be described in more detail with reference to examples. These embodiments are only for illustrating the present invention and the scope of the present invention is not construed as being limited by these embodiments.

Inventive Example: Preparation of Precursor

In order to prepare a cathode active material, nickel sulfate, cobalt sulfate, and manganese sulfate were prepared to first prepare precursors 1 to 3 including a core portion and a shell portion by a co-precipitation reaction. Here, the precursors were prepared such that compositions of the entire core and shell portions were 5 mol %, 9 mol %, and 12 mol % (Inventive Examples 1 to 3), respectively.

LiOH was added as a lithium compound and subjected to a first heat—treatment in the presence of $N_2$ and $O_2$/(1~100 LPM) at a heating rate of 1° C./min~20° C./min for 4 to 20 hours (with respect to a maintained range). After the first heat treatment, 0 to 10 mol % of a compound containing Al was added to the resultant mixture and subjected to a secondary heat-treatment to prepare a cathode active material for a lithium secondary battery.

Next, distilled water was prepared and maintained at a constant temperature of 5 to 40° C. Thereafter, the prepared cathode active material for a lithium secondary battery was put into the distilled water and rinsed for 0.1 to 10 hours, while the temperature was maintained.

The rinsed cathode active material was filter-pressed and then dried at 50 to 300° C. for 3 to 24 hours under the atmosphere of oxygen.

Comparative Example: Preparation of Precursor

A cathode active material was prepared in the same manner as that of Inventive Example except that the cobalt content in the entire core and shell portions was 3 mol %.

Experimental Example: Measurement of Particle Size

Figure 1:
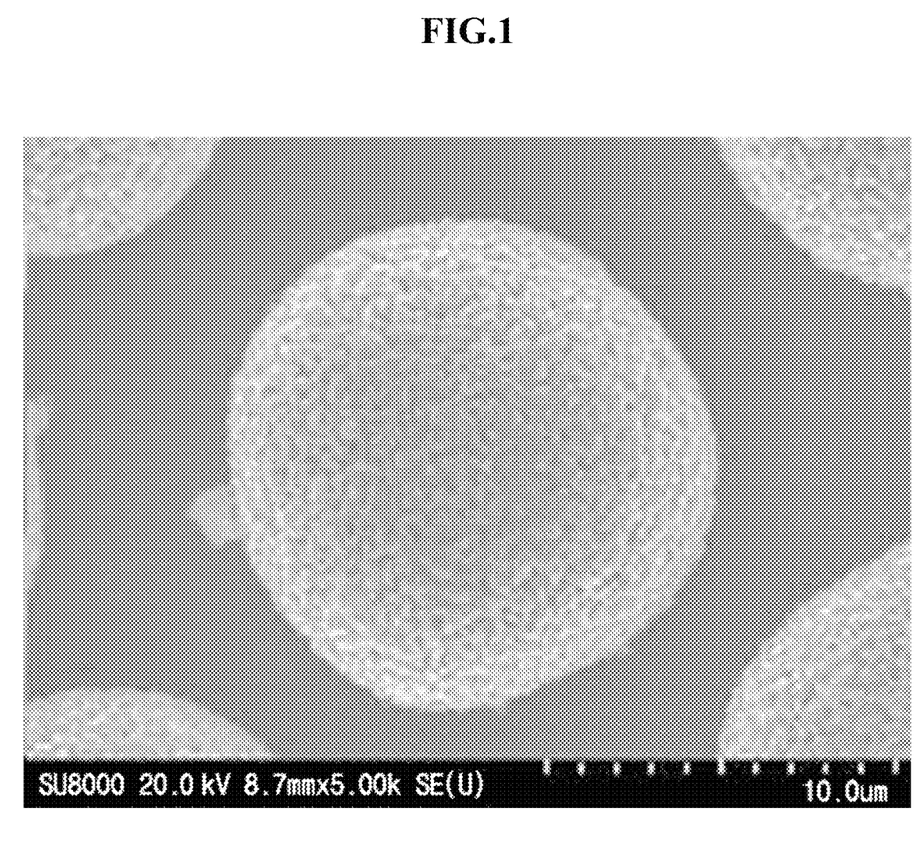
FIGS. 1 and 2 show results of measuring a size and an internal metal concentration of a cathode active material prepared according to an embodiment of the present invention.

A particle size of Inventive Example 1 was measured and results thereof are shown in FIG. 1. As shown in FIG. 1, it can be seen that the particle size prepared according to Inventive Example of the present invention is 10 to 25 μm.

Experimental Example: Measurement of Thickness of Shell Portion

Figure 2:
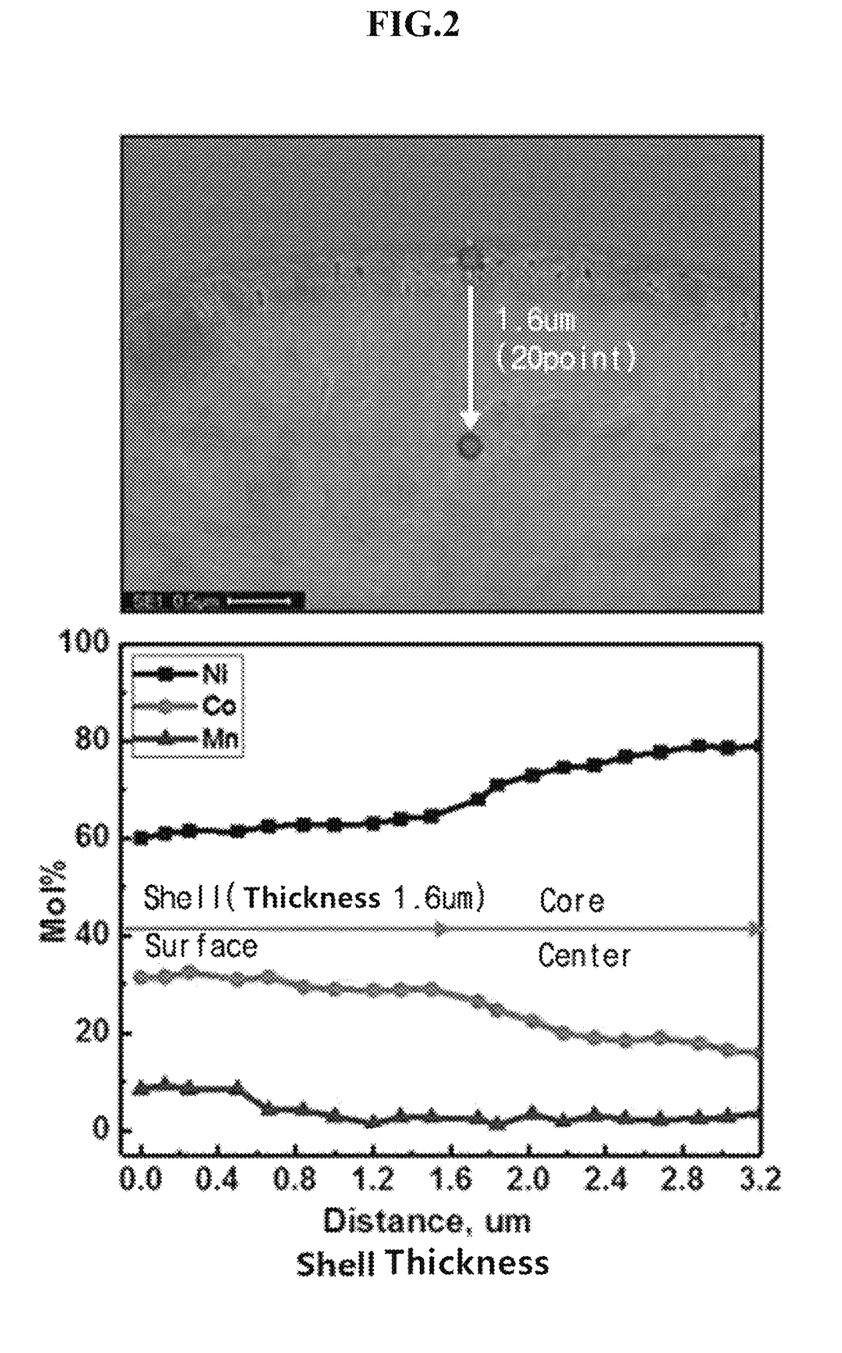

A thickness of the shell was measured on the basis of metal concentrations from a surface to the inside of the particle prepared in Inventive Example 1 and results thereof are shown in FIG. 2.

As shown in FIG. 2, it can be seen that a thickness of the shell of the particle prepared according to Inventive Example is 1.6 um.

Manufacturing Example: Manufacturing of Half-Cell 94 wt % of the cathode active materials prepared according to Inventive Examples 1 to 3 and Comparative Example, 3 wt % of a conductive material (super-P), and 3 wt % of a binder (PVDF) were mixed in the ratio of 4.7 g:0.15 g:0.15 g, respectively, mixed at 1,900 rpm/10 min. by a stirrer, applied to an Al foil by a micro-film applicator, and subsequently dried in a dry oven at 135° C. for four hours to manufacture a positive plate.

A coin cell was manufactured using a lithium metal foil as a negative plate, polypropylene of W-Scope-20 μm as a separator, and 1.15 M LiPF having a composition of EC/EMC=7/3 as an electrolyte.

Experimental Example: Measurement of Charging/Discharging Characteristics

Figure 3:
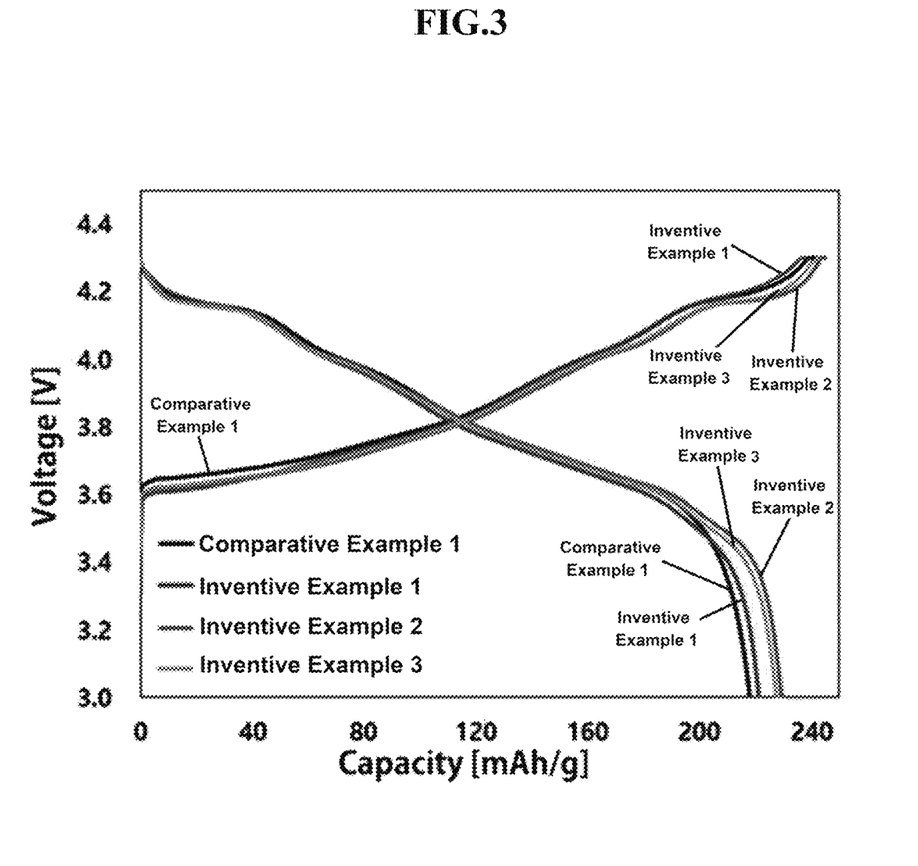
FIGS. 3 to 6 show results of measuring characteristics of batteries including cathode active materials of Inventive Examples of the present invention and Comparative example.

The charging/discharging characteristics of the particles of Inventive Examples 1 to 3 and the particles of Comparative Example were measured, and results thereof are shown in FIG. 3 and Table 1.

As shown in FIG. 3 and Table 1, it can be seen that, when a mole fraction of Co in the entire core and shell portions was 9%, the charging/discharging characteristics were significantly improved, as compared with Comparative Example.

TABLE 1

|  | Charge Capacity (mAh/g) | Discharge Capacity (mAh/g) | Efficiency (%) | C-rate Retention (%) (5 C/0.1 C) | EIS (Ohm) | Cycle Retention (%) (50 Cyc) | Remark Co Composition |
|---|---|---|---|---|---|---|---|
| Comparative Example | 241.1 | 218.1 | 90.5% | 77.8 | 44.7 | 91.1 | 3% |
| Inventive Example 1 | 238.3 | 220.8 | 92.7% | 80.4 | 28.4 | 95.1 | 5% |
| Inventive Example 2 | 244.5 | 229.8 | 94.8% | 82.1 | 16.7 | 94.6 | 9% |
| Inventive Example 3 | 242.0 | 227.6 | 94.0% | 82.0 | 18.4 | 95.0 | 12% |

Experimental Example 2: Measurement of Output Characteristics

Figure 4:
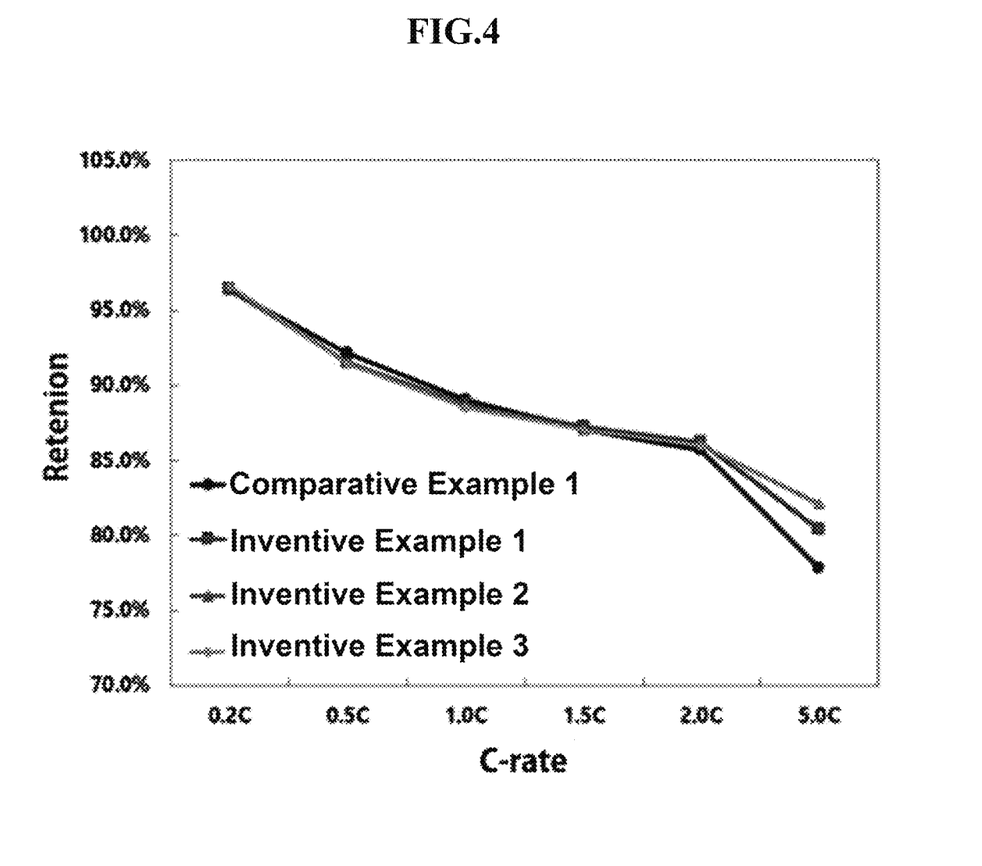

Output characteristics of the particles of Inventive Examples 1 to 3 and the particles of Comparative Example were measured and results thereof are shown in FIG. 4 and Table 1.

As shown in FIG. 4 and Table 1, it can be seen that, when a mole fraction of Co in the entire core and the shell portions was 9%, the output characteristics were significantly improved, as compared with Comparative Example.

Also, in FIG. 4 and Table 1, it can be seen that the secondary battery including the cathode active material according to the present invention has especially improved high-rate characteristics.

Experimental Example 3: Measurement of Electrochemical Impedance Spectroscopy (EIS) Characteristics EIS resistance characteristics of the particles of Inventive Examples 1 to 3 and the particles of Comparative Example were measured, and results thereof are shown in FIG. 5 and Table 1.

Figure 5:
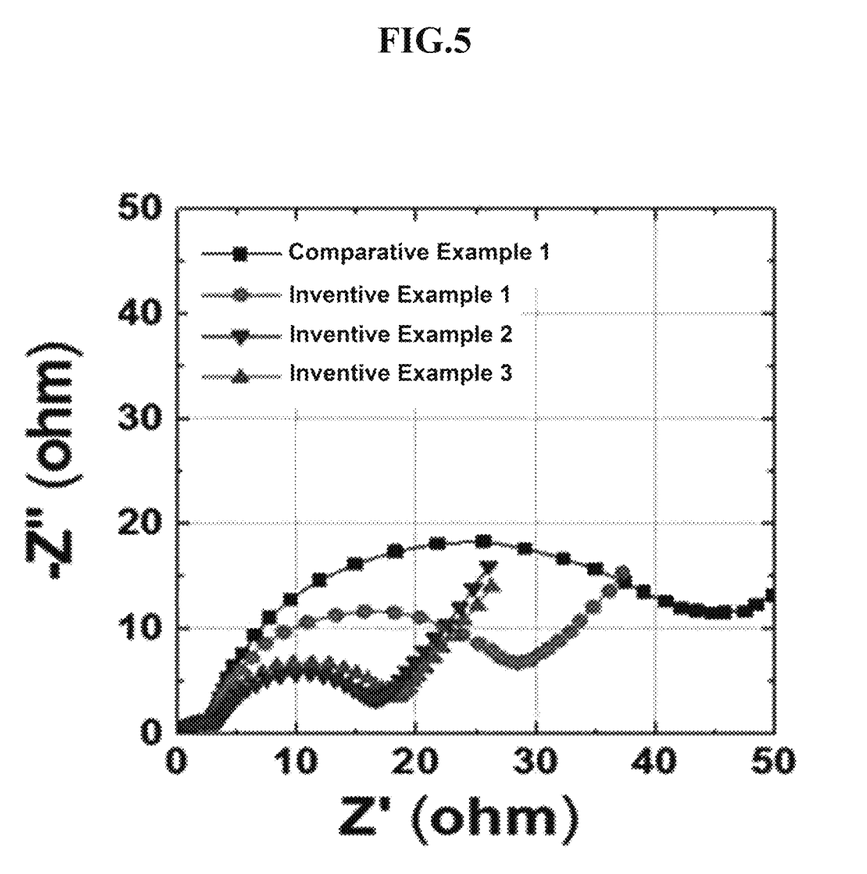

As shown in FIG. 5 and Table 1, it can be seen that, when a mole fraction of Co in the entire core and shell portions was 9%, the EIS resistance characteristics were significantly improved, as compared with the Comparative Example.

Experimental Example 4: Measurement of Life Characteristics

Figure 6:
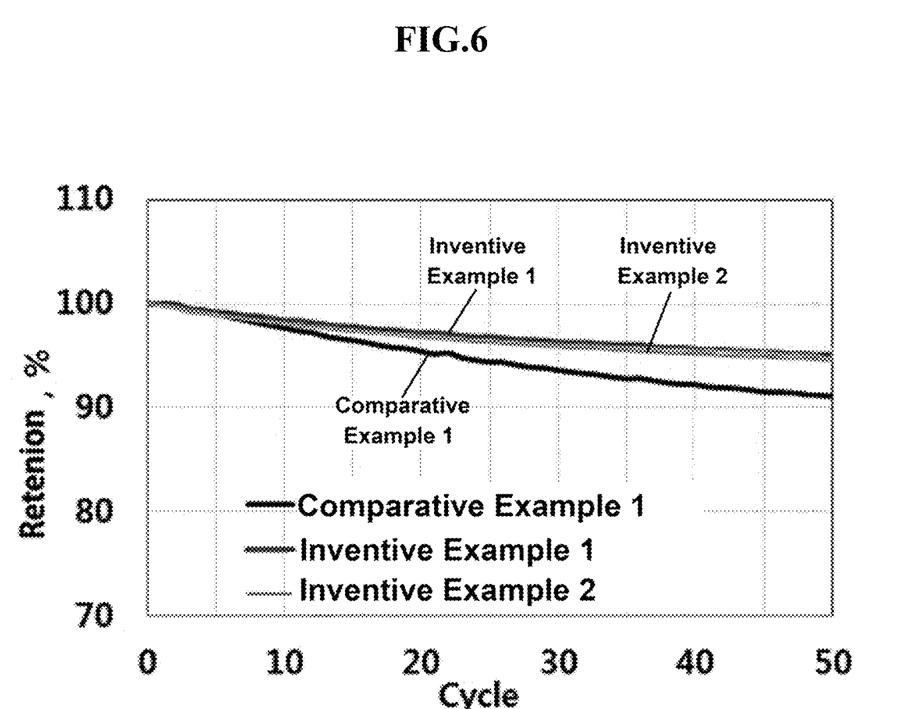

Life characteristics of the particles of Inventive Examples 1 to 3 and the particles of Comparative Example were measured, and results thereof are shown in FIG. 6 and Table 1.

As shown in FIG. 6 and Table 1, it can be seen that, when a mole fraction of Co in the entire core and shell portions was 12%, the life characteristics were significantly improved, as compared with Comparative Example.

What is claimed is:

1. A cathode active material for a lithium secondary battery, the cathode active material comprising:
   a core portion and a shell portion surrounding the core portion, that together form a particle,
   wherein a total content of cobalt in the core portion and the shell portion is 5 to 12 mol %,
   wherein the content of cobalt in the entire particle is W, the content of cobalt in the shell portion is 0.2 W to 1.0 W,
   wherein the particle comprises cobalt and the content of cobalt in the shell portion is more than 20 mol %,
   wherein when the particle comprises manganese, the content of manganese in the shell portion is less than 20 mol %,
   wherein a diameter of the entire particle D is 1 μm to 25 μm, and
   wherein a thickness of the shell portion is 0.01 D to 0.3 D.

2. The cathode active material of claim 1, wherein the cathode active material for a lithium secondary battery is represented by Chemical Formula 1 below:

(where $0.9 \leq a \leq 1.3$, $0.7 \leq x < 1.0$, $0.05 \leq y \leq 0.12$, $0.0 \leq z \leq 0.3$, and $0.0 \leq 1-x-y-z \leq 0.3$, wherein M is one or more elements selected from among B, Ba, Ce, Cr, F, Mg, Al, Cr, V, Ti, Fe, Zr, Zn, Si, Y, Nb, Ga, Sn, Mo, W, P, Sr, Ge, and Cu).

3. The cathode active material of claim 2, wherein a concentration of cobalt in the core portion and a concentration of cobalt in the shell portion are not equal.

* * * * *